(12) United States Patent
Lazarev et al.

(10) Patent No.: US 6,942,925 B1
(45) Date of Patent: Sep. 13, 2005

(54) DICHROIC POLARIZER

(75) Inventors: Pavel Ivanovich Lazarev, Moscow (RU); Alexandr Alexandrovich Miroshin, Moscow (RU); Nikolai Vladimirovich Malimonenko, Lobnya (RU); Sergei Vasilievich Belyaev, Moskovskaya (RU)

(73) Assignee: Optiva, Inc., South San Francisco, CA (US)

( * ) Notice: Subject to any disclaimer, the term of this patent is extended or adjusted under 35 U.S.C. 154(b) by 0 days.

(21) Appl. No.: 09/485,329

(22) PCT Filed: Aug. 3, 1998

(86) PCT No.: PCT/RU98/00251

§ 371 (c)(1),
(2), (4) Date: Jul. 29, 2002

(87) PCT Pub. No.: WO99/08140

PCT Pub. Date: Feb. 18, 1999

(30) Foreign Application Priority Data

Aug. 11, 1997  (RU) ........................................ 97113613 A

(51) Int. Cl.$^7$ ............................................... B32B 9/00
(52) U.S. Cl. .................... 428/432; 428/433; 428/698; 428/699; 428/701; 428/702; 428/704; 359/490; 359/491; 359/493
(58) Field of Search ................................ 428/1.2, 1.31, 428/1.51, 432, 433, 689, 698, 699, 701, 702, 704; 359/487, 489, 490, 491, 493

(56) References Cited

U.S. PATENT DOCUMENTS

| | | | |
|---|---|---|---|
| 4,639,069 A |   | 1/1987 | Yatabe et al. |
| 4,783,150 A | * | 11/1988 | Tabony ........................ 349/20 |
| 5,126,880 A |   | 6/1992 | Wheatley et al. ............ 359/587 |
| 5,673,127 A | * | 9/1997 | Takahara et al. ............. 349/140 |
| 5,686,979 A | * | 11/1997 | Weber et al. ................ 359/487 |
| 5,828,488 A | * | 10/1998 | Ouderkirk et al. .......... 359/487 |

FOREIGN PATENT DOCUMENTS

| | | |
|---|---|---|
| EP | 0 961 138 A1 | 12/1998 |
| JP | 57208063 | 6/1984 |

(Continued)

OTHER PUBLICATIONS

English Abstract of SU application 4908695/10 of Feb. 1991 for SU 1,778,731 of Nov. 1992.

(Continued)

*Primary Examiner*—Deborah Jones
*Assistant Examiner*—G. Blackwell-Rudasill
(74) *Attorney, Agent, or Firm*—Dorsey & Whitney LLP

(57) ABSTRACT

The invention belongs to polarizing devices and can be used in lighting equipment, manufacturing construction-material glasses, and in displays.

Figures 1, 2:
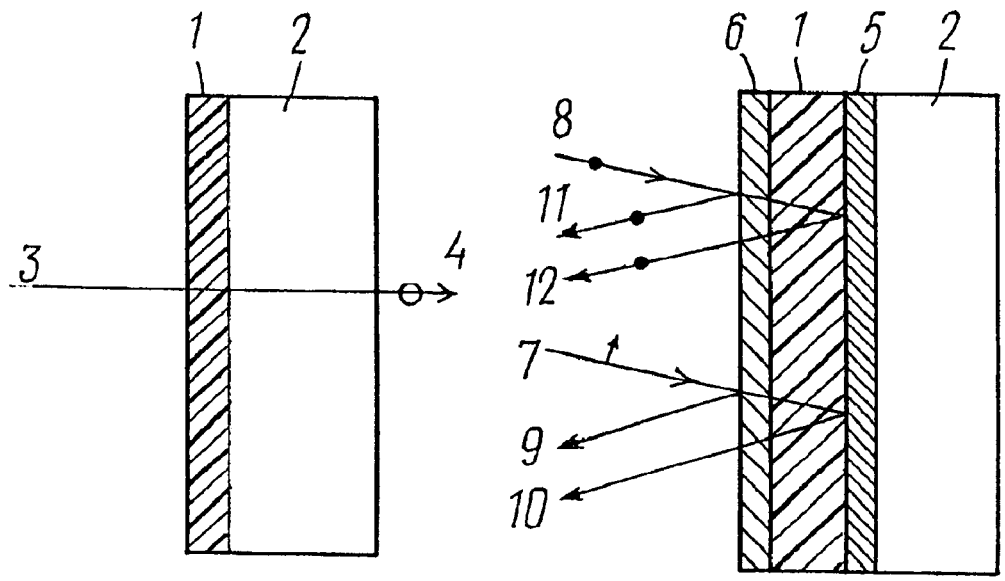

The proposed dichroic polarizer includes a substrate and at least one layer dichroically absorbing electromagnetic radiation, into which two reflecting coatings are introduced, at least one of which is made partially transmitting. The layer dichroically absorbing electromagnetic radiation is located between the reflecting coatings. The materials and thicknesses of layers of both the dichroically absorbing electromagnetic radiation and the reflecting coatings are selected from the requirements to obtain, at the exit of the dichroic polarizer, an interference minimum for the absorbing component of electromagnetic radiation for, at least, one wavelength value.

The invention leads to increasing efficiency of dichroic polarizers at the expense of increasing degree of polarization of electromagnetic radiation leaving the polarizer, while high transmission (reflection) coefficient for the non-absorbed component is preserved. 5 formulas, 3 illustrations.

9 Claims, 1 Drawing Sheet

FOREIGN PATENT DOCUMENTS

| | | |
|---|---|---|
| SU | 1778731 | 11/1992 |
| WO | WO 94/25895 A1 | 11/1994 |
| WO | 9428073 | 12/1994 |
| WO | 9517691 | 6/1995 |
| WO | WO 96/16402 A1 | 5/1996 |
| WO | WO 97/08692 A1 | 3/1997 |
| WO | WO 97/39380 * | 10/1997 |

OTHER PUBLICATIONS

Taccheo, S. et al., *Linearly Polarized, Single–Frequency, Widely Tunable Er: Yb Bulk Laser at Around 1550 nm Wavelength*, American Institute of Physics, Applied Physics, vol. 69 (21), (Nov. 18, 1996), pp. 3128–3130.

* cited by examiner

DICHROIC POLARIZER

The invention belongs to polarizing devices and can be used in lighting equipment; manufacturing construction-material glasses and optical instruments, for example, spectrophotometers and displays.

The action of dichroic polarizers considered within the framework of the proposed invention is based on the property of a number of materials usually termed dichroic, to differently absorb orthogonal linearly-polarized components of electromagnetic radiation. Dichroic film polarizers termed polaroids or polarizing light filters are the most widely applied. To create them, materials containing molecules or particles (for example, microcrystals) are commonly used which, along with strong absorption, have strong dichroism in a wide range of wavelengths. As a rule, these molecules or particles have extended shapes, so orientation of molecules or particles is performed during manufacturing a polarizer in the certain (chosen) direction, also known as the absorption axis. The transmission plane of the polarizer (the polarizer plane) is then located perpendicularly to the absorption axis. The absorption degree of the components depends on orientation of the electrical vector oscillation relative to the chosen direction. When considering the functioning of polarizers, it is convenient to designate the orthogonally polarized components according to the degree of their absorption. Further, the terms absorbed (parasitic) component and non-absorbed (the useful component) will be used.

To estimate the efficiency (quality) of polarizers, including dichroic polarizers, and to compare between them, their polarizing abilities (degree of polarization) are normally used, which are determined using various methods (A. I. Vanyurikhin, V. P. Gerchanovskaya, "Optical polarizing devices", Kiev, Tekhnika, 1984 [1], page 23, in Russian). Further, the degree of polarization will mean the value determined, for a transmissive polarizer, via the energy transmission coefficients $T_1$ and $T_2$ for the non-absorbed and the absorbed orthogonally polarized component respectively:

$$P=(T_1-T_2)/(T_1+T_2),$$

while, for the reflective polarizer, through the energy-related reflection coefficients $R_1$ and $R_2$ for the non-absorbed and the absorbed orthogonally polarized component respectively:

$$P=(R_1-R_2)/(R_1+R_2)$$

Dichroic polarizers are known consisting of polymeric films strongly stretched in one direction and containing dichroic molecules, which become oriented during stretching, for example, the iodine-polyvinyl polarizers based on polyvinyl alcohol ([1], pages 37–42). These polarizers are multilayer films including, along with the polarizing layer, also the reinforcing, gluing, and protecting layers. The basic disadvantage of the specified film polarizers is rather high labor input required for their manufacturing.

The polarizer closest in the technical basis to the one described herein is the dichroic polarizer including a substrate on which a molecularly oriented layer is deposited which has been obtained from organic dye which is in the lyotropic liquid crystal state (application PCT 94/05493, Cl. C09B31/147, 1994). Use of such dyes allows to considerably simplify the technology of manufacturing; dichroic polarizers, and to lower their cost accordingly, but the dichroic polarizers thus obtained do not have the sufficient degree of polarization.

The purpose of the invention is to increase the efficiency of a dichroic polarizer at the expense of increasing the polarization degree of electromagnetic radiation, while preserving the high transmission (reflection) coefficient for the non-absorbed component.

The purpose set herein is achieved because, in a dichroic polarizer containing a substrate and a layer of a dichroic material, two reflecting coatings are introduced, at least one of which is made partially transmitting, and the dichroically absorbing layer is located between the two reflecting coatings. Such a multilayer structure allows to obtain multipath interference and resembles the Fabry-Perot interferometer.

The dichroic polarizer can be implementing as a reflective one, and one of the reflecting coatings will in this case be made completely reflecting, while the second will be partially transmitting. Then, the first coating to be deposited from the substrate side may be either the reflecting one (completely reflecting), or the partially transmitting one.

The multipath interference results in obtaining, at the exit of the dichroic polarizer, interference maxima, minima, as well as intermediate intensity values, depending on thicknesses and materials of layers and coatings constituting the polarizer.

Analysis of the influence of interference picture at the exit of the proposed polarizer on the polarization degree of radiation has shown that, when an interference maximum of intensity is obtained, there is an increase in either the energy-related transmission coefficient or, in the other polarizer type (reflective rather than transmissive), the reflection coefficient, for both the absorbed and the non-absorbed components. Thus the ratio of intensities of the transmitted (or reflected) radiation of the orthogonally polarized components decreases, and the degree of polarization decreases accordingly. Although this increases transmission (reflection) of the polarizer, this is not so important as reduction of the polarization degree.

When an interference minimum is obtained at the exit of a polarizer, the intensity is reduced of both orthogonally polarized components. However, both the calculations and the experimental data have shown that it is possible to reduce the intensity of the absorbed components more significantly than that of the non-absorbed components. Although this causes some reduction in transmission (reflection) of the polarizer, the degree of polarization substantially increases.

It is therefore relevant that the materials and layer thicknesses of the dichroic polarizer should be chosen from the requirement to obtain, at the polarizer exit, an interference minimum for the absorbed components for at least one wavelength of the electromagnetic radiation.

The wavelength for which an interference minimum should be obtained can be set at, for example, the wavelength corresponding to the middle of the used spectral range.

The width of the used spectral range is then determined from the following considerations.

The condition of obtaining an interference minimum at the exit of a dichroic polarizer can be written as:

$$\Delta = m\lambda + \lambda/2,$$

where $\Delta$ is the difference in the path lengths of two beams reflected from the reflecting coatings when the beams leave the polarizer, m is the order of interference, $\lambda$ is the light wavelength. With a sufficient degree of accuracy, the interference minimum also appears for the neighboring wavelengths, for which the path length difference a differs by no more than 10%. For larger orders of interference (m=10–50), i.e. when the thickness of the layer dichroically absorbing electromagnetic radiation is large enough, the condition of 10% difference in the path length is satisfied for a very narrow range of wavelengths, so the polarizer can be used only as a narrowband one. When the order of interference is zero (m=0), i.e. for small enough thickness of layer dichroically absorbing electromagnetic radiation, this condition is satisfied for a wider wavelength range. For example, if 550 is taken to be the basic wavelength for which the equality (3) is valid, the requirement to obtain an interference minimum will be satisfied for, practically, the entire visible range. Hence, when thickness of the dichroically absorbing layer is comparable to the radiation wavelength, a broadband polarizer can be obtained.

From the theory of interference, it is known that, to obtain an interference minimum, the optical path length difference between interfering beams should be $(\lambda/2+m\lambda)$, which is an odd number of half-waves.

To ensure such path length difference, the thickness of the dichroically absorbing layer is determined for at least one wavelength from the equality $\lambda/4 + \lambda/2 = \lambda/4(1+2m)$.

The outcome of interference is largely influenced by the ratio of amplitude values of the interfering beams. It is known that the minimal intensity value can be obtained when the amplitudes are equal. Therefore, it is relevant to make the amplitude values of the interfering beams for the absorbed components as close as possible to each other, which would provide maximal mutual cancellation of beams of these components. Simultaneously, one should ensure a significant difference between the amplitudes of the interfering beams for the non-absorbed components, which will practically exclude the opportunity for these beams to interfere, i.e. intensities of the non-absorbed components will not be appreciably reduced. If both requirements are satisfied, increase in the polarization degree will be ensured, which is more important than some decrease in transmission (reflection) of the polarizer.

From the above considerations, it is relevant that the thickness h of the dichroically absorbing layer was chosen from the requirement for the following equality to be valid for at least for one wavelength $\lambda$:

$$hn = m\lambda + \lambda/4 = (2m+1)*\lambda/4,$$

where n is the is refraction coefficient of the dichroically absorbing layer, and m is an integer, while the thickness and the material of reflecting coatings are chosen from the requirement to ensure, for the absorbed components, equality or approximate (to within 10–20%) equality of amplitudes for at least two interfering beams for at least one wavelength.

The reflecting coatings can be made either of metal, or manufactured from multilayer dielectric mirrors consisting of alternating layers of materials with high and low refraction coefficients.

The metal coatings are easy enough to deposit, for example, by thermal evaporation in vacuum. But then, light is absorbed in such coatings, which reduces transmission (reflection) of the polarizer. For these coatings, aluminium (Al), silver (Ag), and other metals can be used.

In case of multilayer dielectric mirrors, light is not absorb in them, but the process of their deposition is rather complex and labor-consuming. For these coatings, $TiO_2$, MgO, ZnS, ZnSe, or $ZrO_2$, or polymers can be used as the high refraction coefficient materials. As the low refraction coefficient materials, $SiO_2$, $Al_2O_3$, $CaF_2$, $BaF_2$, AlN, BN, or polymers can be used.

The following standard methods can be used to deposit reflecting coatings: thermal evaporation in vaccum, deposition in vapor with subsequent thermal processing, magnetronic dispersion, and others.

As a material for manufacturing the dichroically absorbing layer, any dichroically absorbing material can in principle be used, which can be shaped as a layer with the thickness comparable to the wavelength, in particular, equal to $\lambda/4$. However, it is more relevent to use a molecularly oriented organic dye which is in the iyotropic liquid crystalline state, from the following series:

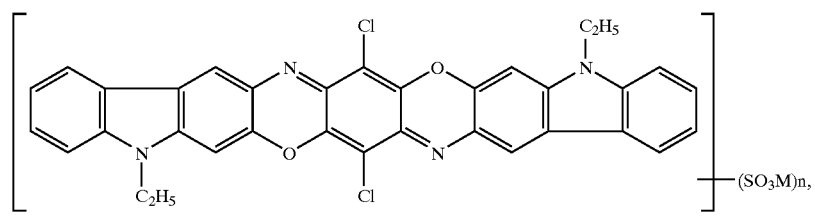

I n = 2–4, M - cation

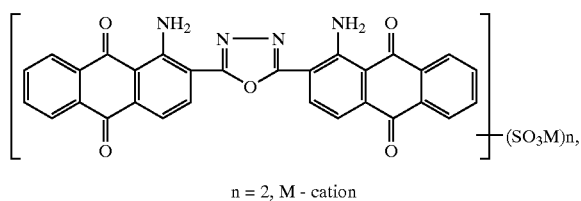
n = 2, M - cation
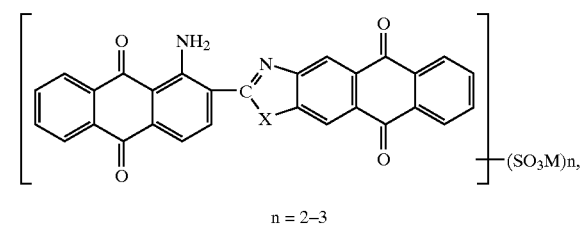
n = 2–3
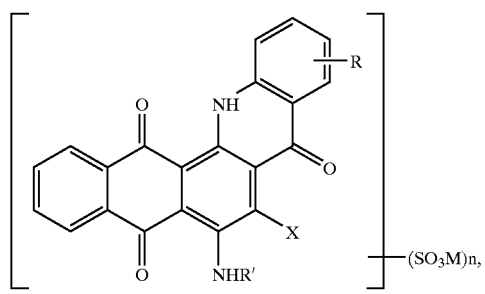
R = H, CF$_3$; X = H, Br, SO$_3$M; n = 1–3;
R = H, (a);   R'' = H, Cl (b);
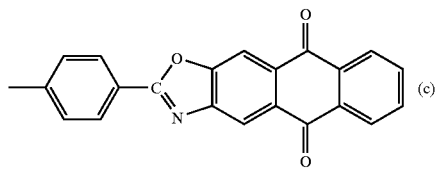
(c)
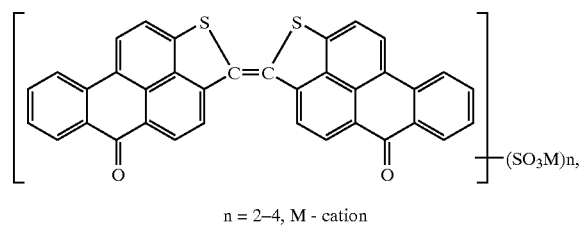
n = 2–4, M - cation
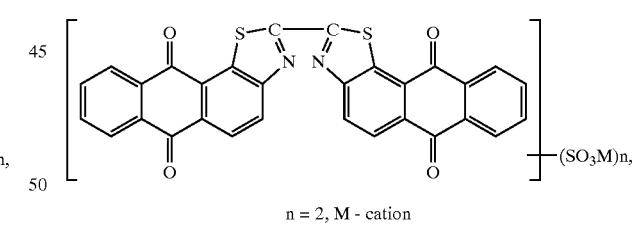
n = 2, M - cation
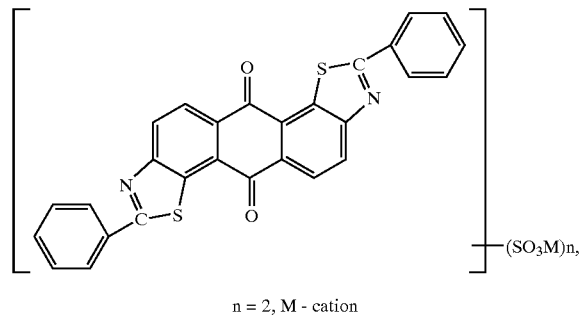
n = 2, M - cation
-continued
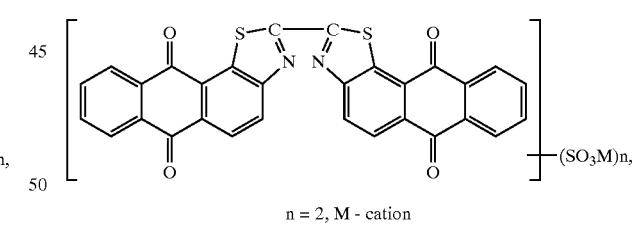
n = 2, M - cation
VIII
n = 2–3, M - cation

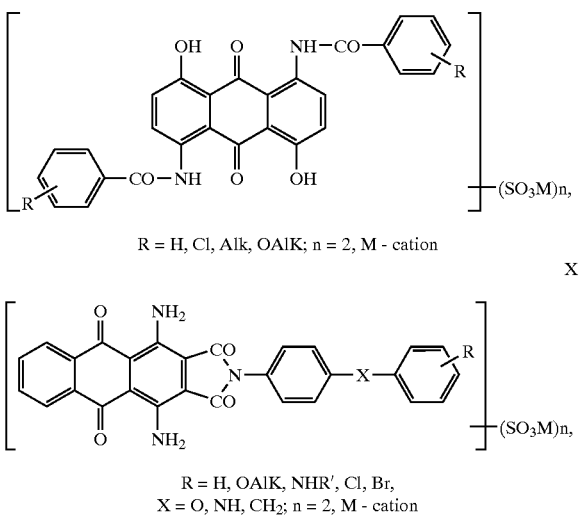

R = H, Cl, Alk, OAlK; n = 2, M - cation

R = H, OAlK, NHR', Cl, Br,
X = O, NH, CH₂; n = 2, M - cation

The specified organic dyes allow to orient the dichroic dye molecules directly during layer deposition. Thus, the technological process of obtaining dichroic polarizers becomes considerably simpler, and, consequently, its cost decreases.

To deposit a layer dichroically absorbing electromagnetic radiation, the following standard methods can be applied; deposition by a platen, by a doctor knife, by a doctor in the form of a non-rotating cylinder, deposition using a slit spinneret or die, etc.

Figure 3:
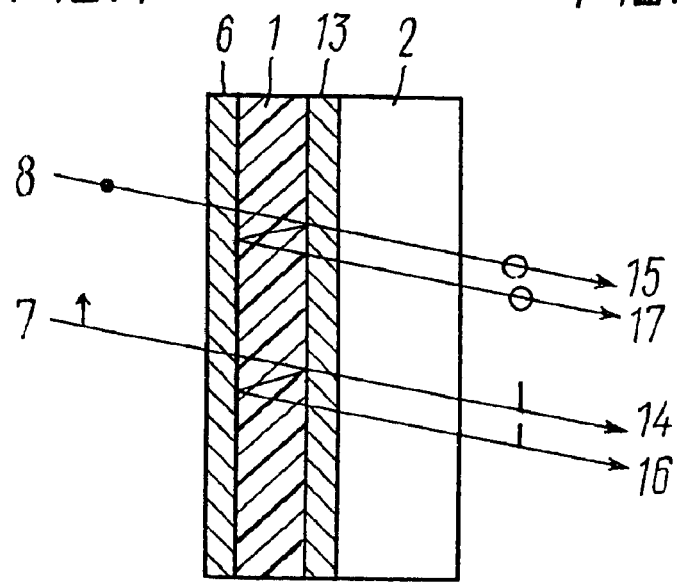

The invention is illustrated by FIGS. 1–3. In FIG. 1, a scheme is shown of a dichroic polarizer according to the prototype. In FIG. 2, a scheme of a reflective-type dichroic polarizer is shown according to the invention. In FIG. 3, a scheme of a transmitted-light dichroic polarizer according to the invention is shown.

In FIG. 1, the scheme of a dichroic polarizer according to the prototype is presented including a layer 1 dichroically absorbing electromagnetic radiation and deposited onto a substrate 2. In the dichroic polarizer according to the prototype, non-polarized electromagnetic radiation 3 passes the layer 1 dichroically absorbing electromagnetic radiation and deposited on the substrate 2, and becomes the linearly polarized electromagnetic radiation 4.

Analysis of properties of the prototype dichroic polarizer has shown that, when the thickness of the layer 1 dichroically absorbing electromagnetic radiation, is 50 nm, for the polarization degree of 80%, transmission of the useful polarized component by the dichroic polarizer is 90%. When the thickness of the layer 1 dichroically absorbing electromagnetic radiation is 500 nm, for the polarization degree of 90%, transmission of the useful polarized component by the dichroic polarizer is 80%. When the thickness of the layer 1 dichroically absorbing electromagnetic radiation is 2000 nm, for the degree polarization of 99%, transmission of the useful polarized component by the dichroic polarizer is 50%.

In FIG. 2, a scheme of a dichroic reflective-type polarizer according to the invention is presented including a layer 1 dichroically absorbing electromagnetic radiation, a layer 5 completely reflecting electromagnetic radiation, and a layer 6 partially reflecting electromagnetic radiation. All layers are consecutively deposited onto a substrate 2.

Operation of the proposed dichroic reflective polarizer can be explained as follows. The non-polarized electromagnetic radiation consists of two linearly polarized components 7 and 8, with their polarization planes mutually perpendicular (these two components are conventionally shown apart from each other in FIGS. 2 and 3 for better presentation and understanding). The absorbed and not further used component 7, which is polarized parallel to the absorption axis of the layer 1 dichroically absorbing electromagnetic radiation, is partially reflected from the layer 6 partially reflecting electromagnetic radiation, and forms the beam 9. The other part of energy of the component 7 passes through the layer 1 dichroically absorbing electromagnetic radiation, and, after being reflected from the layer 5 completely reflecting electromagnetic radiation, passes the layer 1 once again and then the layer 6 forming the beam 10. The reflected beams 9 and 10 are polarized identically to the initial component 7. The thickness of the layer 1 is chosen so as the optical path length difference between beams 9 and 10 becomes an odd number of half-waves of polarized electromagnetic radiation, where the wavelength corresponds to the middle of the used spectral range. In this case, interference of the beams 9 and 10 result in their mutual weakening, and the complete cancellation in the optimum case. Complete mutual cancellation of the beams 9 and 10 is achieved if the intensities (amplitudes) of the beams 9 and 10 have either identical or close values, which can be achieved by optimally selecting reflection coefficients of the reflecting layers 5 and 6. The reflecting layer 5 and 6 can be made of metal, semiconductor or dielectric, and be either single-layer or multilayer.

The other further used linearly polarized component 8 non-absorbed in the layer 1, which is polarized perpendicularly to the optical axis (absorption axis) of the layer 1, is partially reflected form the layer 6 partially reflecting electromagnetic radiation, and forms the beam 11. The other part of energy of the component 8 passes through the layer 1 dichroically absorbing electromagnetic radiation, and, after being reflected from the layer 5, passes the layer 1 once again and then the layer 6, and forms the beam 12. The reflected beams 11 and 12 are polarized identically to the initial component 8. Interference results in weakening the beams 11 and 12 considerably less than the beams 9 and 10. This is caused by the fact that their intensities considerably differ because of the negligibly small absorption of the beam 12 in the layer.

In FIG. 3, the scheme of a dichroic polarizer of a transmissive type according to the invention is presented. The polarizer includes a layer 1 dichroically absorbing electromagnetic radiation and layers 6 and 13 partially reflecting electromagnetic radiation. All layers are deposited onto a substrate 2.

Operation of a dichroic transmissive-type polarizer of electromagnetic radiation according to the invention can be explained as follows. The non-polarized electromagnetic radiation consists of two linearly polarized components 7 and 8, with their polarization planes mutually perpendicular. Both of these components pass through the layer 6 partially reflecting electromagnetic radiation, and then through the layer 1 dichroically absorbing electromagnetic radiation. A part of the energy of the components 7 and 8 passes through a layer 13 partially reflecting electromagnetic radiation, and forms beams 14 and 15 respectively. The other part of energy of the components 7 and 8 is reflected from the layer 13 partially reflecting electromagnetic radiation passes the layer 1, becomes reflected from the layer 6, once again passes the layers 1 and 13, and forms the beams 16 and 17 respectively. The beams 15 and 17 are polarized identically to the initial component 8, i.e., perpendicularly to the absorption axes. The passed beams 14 and 16 are polarized identically to the initial component 7, i.e., parallel-perpendicular to the absorption axes.

The purpose of this invention is achieved because of unequal reduction of the differently polarized components 7 and 8 of electromagnetic radiation passing through a dichroic polarizer during interference of the parts 9 and 10 of the component 7, as well as parts 11 and 12 of the components 8. This is ensured by specially selecting thicknesses of layer 1, 6 and 13. In particular, the optical thickness of the layer 1 dichroically absorbing electromagnetic radiation should be an integer number of wavelengths of polarized electromagnetic radiation. By changing thicknesses of the layers 13 and 5 partially reflecting electromagnetic radiation, it is possible to select the values of reflection coefficients of these layers optimum for increasing the dichroic polarizer efficiency. A criterion for choosing the reflection coefficients of the layers 13 and 5 can be, for example, the maximal contrast of the dichroic polarizer. The optimum thicknesses of the layers 13 and 6 do not affect the basis of the invention.

The layers 13 and 6 partially, reflecting electromagnetic radiation can be made of metal or a multilayer dielectric, which does not affect the basis of the invention.

Examples of specific embodiments of the dichroic polarizer are given below.

EXAMPLE 1

A dichroic polarizer of the reflective type according to the invention (FIG. 2) for polarization in the visible (light) wavelength range, i.e. for the wavelengths band of 400–700 nm, is made as follows. On a glass substrate, the following layers are consecutively deposited: an aluminium, strongly reflecting layer of 100 nm thickness (deposited using thermal evaporation in vacuum); then a 50 nm thick layer dichroically absorbing electromagnetic radiation made of a mixture of dyes . . . of Formulas 1,2,3; and then a 2 nm thick aluminium layer partially reflecting electromagnetic radiation.

Measurements have shown the polarizing ability in the dichroic polarizer thus manufactured to be 92%, the reflection of the useful polarized component by the dichroic polarizer being 90%. A similar polarizing parameter in the prototype deposited onto a mirror was 80% for the same dyes and with the same thickness, and reflection of the useful polarized component by the dichroic polarizer was 90%.

EXAMPLE 2

A dichroic reflective-type electromagnetic radiation polarizer (FIG. 2) polarizing in the visible (light) wavelength range is manufactured as follows. A strongly reflecting layer with 98% reflection coefficient in the 490–510 nm wavelength range is deposited onto a glass plate as a multilayer dielectric coating. This coating is made of alternating $MgF_2$ and cryolite layers. On top of this strongly reflecting layer, a 120 nm thick layer is deposited which dichroically absorbs electromagnetic radiation and is made of oriented dye of Formula II. Then, a layer is deposited partially reflecting electromagnetic radiation, with reflection coefficient of 28%, also made of $MgF_2$ and cryolite layers.

Measurements have shown the polarizing ability in the dichroic polarizer thus manufactured to be 95% in the 490–510 nm wavelength range, the reflection of the useful polarized component by the dichroic polarizer being 90%. The polarizing ability in the prototype deposited onto a mirror was 85%, the reflection of the useful polarized component by the dichroic polarizer being 90%.

EXAMPLE 3

A dichroic transmitted-light electromagnetic radiation polarizer (FIG. 3) polarizing in the wavelength region of 620–640 nm is manufactured as follows. A 20 nm thick, partially reflecting aluminium layer is deposited onto a glass plate (deposition using thermal evaporation in vacuum). Then a 140 nm thick layer dichroically absorbing electromagnetic radiation made of oriented dye of Formula IV is deposited. Finally, the second 20 nm thick aluminium layer partially reflecting electromagnetic radiation is deposited.

Measurements have shown the polarizing ability in the dichroic polarizer thus manufactured to be 98%, the reflection of the useful polarized component by the dichroic polarizer being 80%. The polarizing ability in the prototype was 86%, with 82% transmission of the useful polarized component by the dichroic polarizer.

EXAMPLE 4

A dichroic transmitted-light electromagnetic radiation polarizer according to the invention (FIG. 3) polarizing in the near infrared wavelength range is manufactured as follows. A layer partially reflecting in the 700–1200 nm wavelength range having the reflection coefficient of 40–55% is deposited onto a glass plate as a multilayer dielectric coating made of layers of zinc sulfite and ammonium phosphate. On top of this strongly reflecting layer, a 180 nm thick layer dichroically absorbing electromagnetic radiation made of oriented dye of Formula X is deposited, and then a layer partially reflecting electromagnetic radiation with the reflection coefficient of 28%, also made of layers of zinc sulfite and ammonium phosphate.

Measurements have shown the polarizing ability in the manufactured dichroic polarizer to be 92% in the wavelength range of 700–1200 nm, the reflection of the useful polarized component by the dichroic polarizer being 80%.

The polarizing ability of the prototype was 75%, with 80% reflection of the useful polarized components by the dichroic polarizer.

Thus all the examples demonstrate the enhancement of the dichroic polarizer efficiency due to the increasing of the polarization degree of the electromagnetic radiation admitted and with the same value of the transmittance (reflectance) coefficient for the non-absorbed component.

What is claimed is:

1. A dichroic polarizer comprising:
   a substrate,
   two reflective coatings, and
   a layer dichroically absorbing electromagnetic radiation,
   wherein at least one of the reflective coatings is partially transmitting, and the layer dichroically absorbing electromagnetic radiation is located between the two reflective coatings.

2. The dichroic polarizer of claim 1, wherein both reflective coatings are made partially transmitting.

3. The dichroic polarizer of claim 1, wherein material and thickness of the layer dichroically absorbing electromagnetic radiation are chosen from the requirement to obtain, at the exit of the dichroic polarizer, an interference minimum for the absorbing component of electromagnetic radiation for at least one wavelength range.

4. The dichroic polarizer of claim 1, wherein at least one of the reflective coatings is made of metal.

5. The dichroic polarizer of claim 1, wherein at least one of the reflective coatings is made of multilayer dielectric mirror of the interchanged layers of materials with high and low refraction coefficients.

6. The dichroic polarizer of claim 1, wherein the layer dichroically absorbing electromagnetic radiation is made of an oriented layer of at least one dichroic dye applied from the lyotropic liquid crystalline state.

7. The dichroic polarizer of claim 2, wherein at least one of the reflective coatings is made of metal.

8. The dichroic polarizer of claim 2, wherein at least one of the reflective coatings is made of multilayer dielectric mirror of the interchanged layers of materials with high and low refraction coefficients.

9. The dichroic polarizer of any one of claim 6 wherein said dichroic dye is selected from the group consisting of molecules having the following formulas I–X:

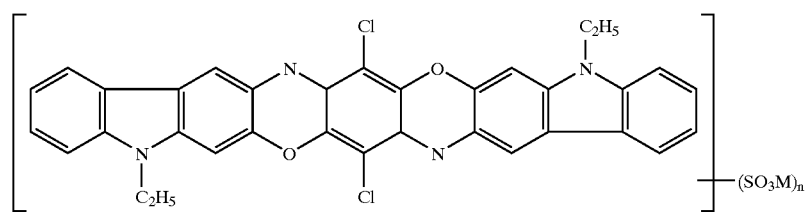

wherein n is an integer in the range of 2 to 4, and M is a cation;

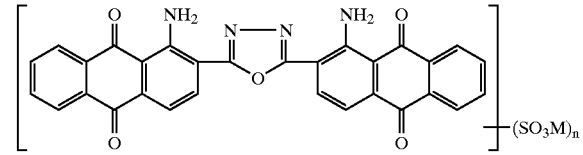

wherein n is an integer equal to 2, and M is a cation;

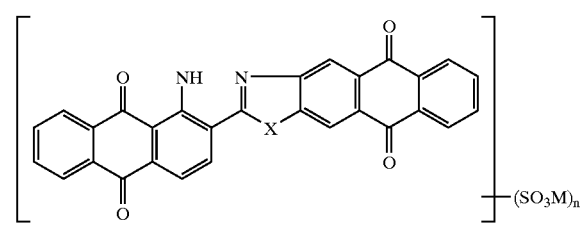

wherein n is an integer equal to 2 or 3, X is S or O, and M is a cation;

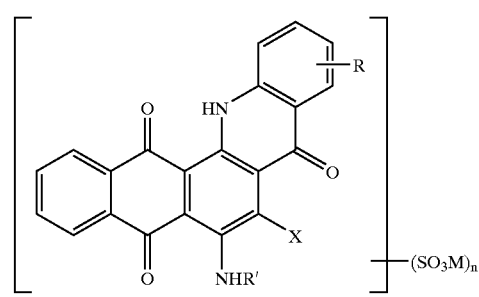

wherein R is H or $CF_3$, X is individually selected from the group of H, Br, and $SO_3M$; n is an integer in the range of 1 to 3, M is a cation, R' is individually selected from the group consisting of H,

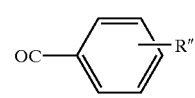

wherein R''=H, Cl, and

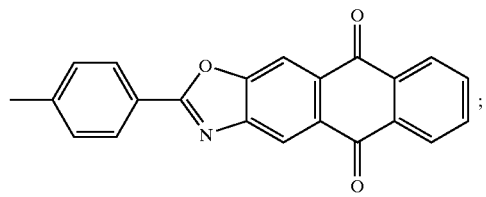

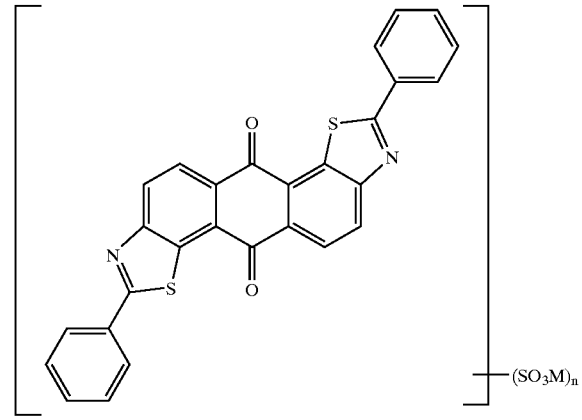

wherein n is an integer in the range of 2 to 4, M is a cation;

wherein n is an integer equal to 2, and M is a cation;

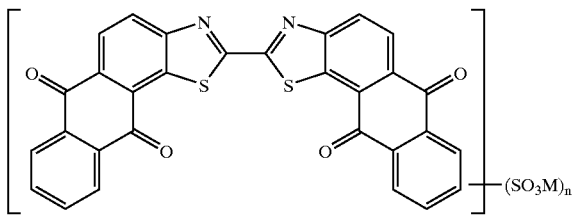

wherein n is an integer equal to 2, and M is a cation;

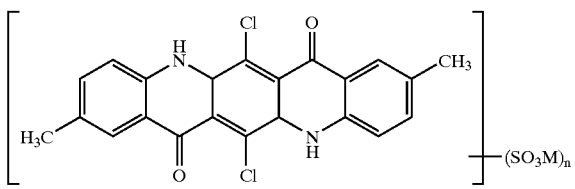

wherein n is an integer equal to 2 or 3, and M is a cation;

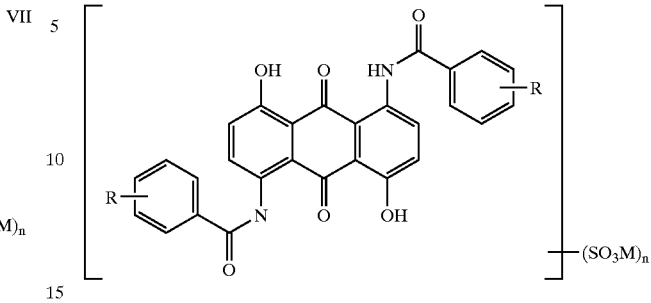

where R is individually selected from the group consisting of H, Cl, Alk, and OAlk, n is an integer equal to 2, and M is a cation; and

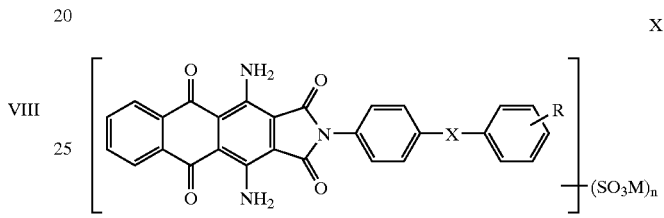

wherein R is individually selected from the group consisting of H, OAlk, NHR', Cl, and Br; X is individually selected from the group consisting of O, NH, and CH$_2$; n is an integer equal to 2, and M is a cation.

* * * * *